UNITED STATES PATENT OFFICE.

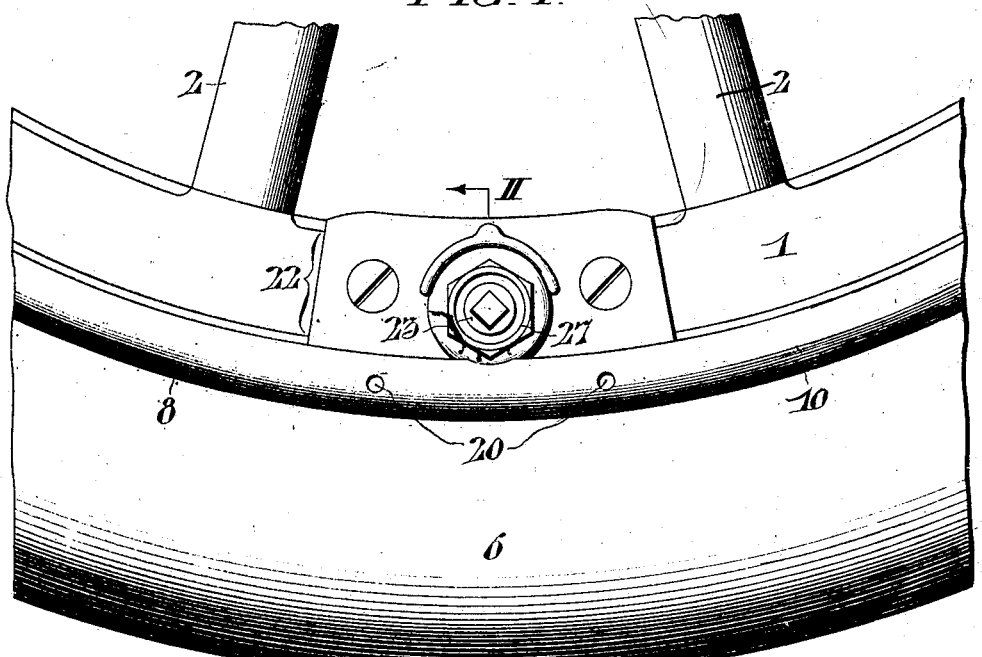
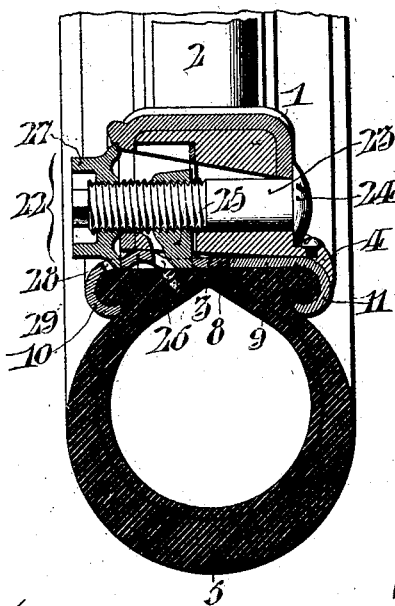

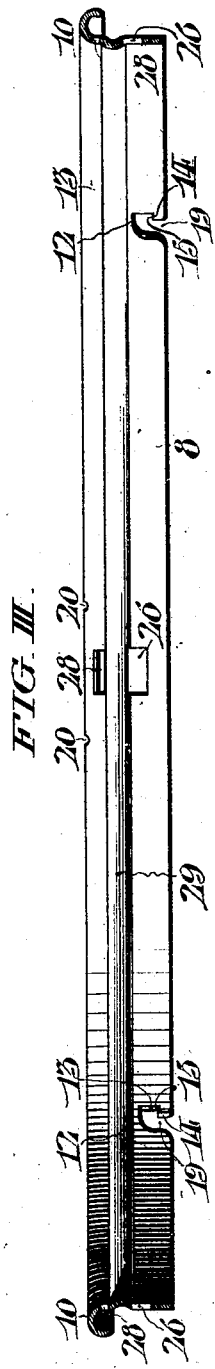
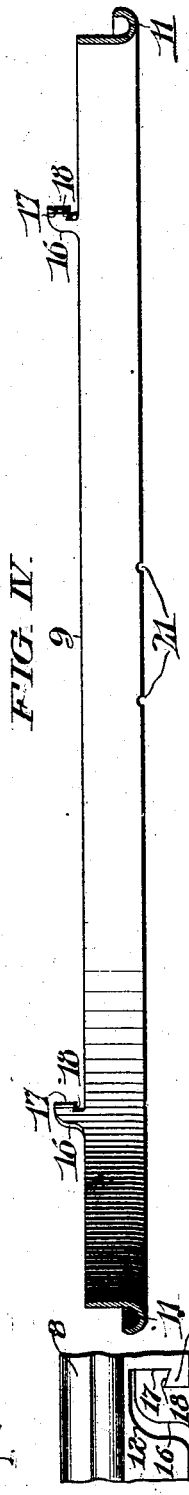
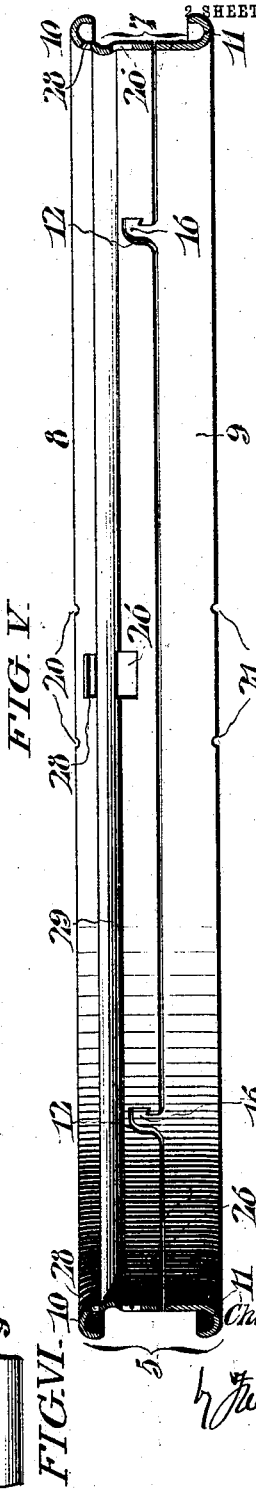

CHARLES W. CRAMER, OF SCRANTON, PENNSYLVANIA.

VEHICLE-WHEEL.

1,071,032.  Specification of Letters Patent.  Patented Aug. 26, 1913.

Application filed September 21, 1911. Serial No. 650,527.

*To all whom it may concern:*

Be it known that I, CHARLES W. CRAMER, of Scranton, in the county of Lackawanna and State of Pennsylvania, have invented certain new and useful Improvements in Vehicle-Wheels, whereof the following is a specification, reference being had to the accompanying drawings.

My invention relates especially to the construction of the rim of the vehicle wheel, whereby a resilient tire may be quickly attached to or detached from the rim, and the felly of the wheel.

An object of the invention is to provide a demountable rim which may be made in sections so that the same may be readily attached to the tire, which sections are so constructed as to be locked together by the inflating of the tire.

A further object of the invention is to provide a construction of felly whereby the demountable rim may be quickly placed thereon, which rim is so constructed as to give a rigid support to the tire and to prevent the accumulating of dust and dirt underneath the rim.

These and other objects will in part be obvious, and will in part be hereinafter more fully described.

In the drawings which show by way of illustration one embodiment of the invention, Figure I, is a side elevation of a portion of a wheel having my improvements applied thereto. Fig. II, is a sectional view on the line II, II, of Fig. I. Fig. III, is a detail showing in section and in plan elevation, one section of the demountable rim. Fig. IV, is a similar view of the other section of the demountable rim. Fig. V, is a similar view showing the sections interlocked. Fig. VI is an enlarged detail view in plan showing the interlocking parts of the rim.

I have shown my invention as applied to the ordinary wheel which includes a felly 1, mounted on spokes 2. The felly 1, has its outer surface 3, inclined to the plane of the wheel so that a demountable rim may be readily slid thereon. Said felly is formed with a retaining flange 4, against which the rim is seated. The surface 3, inclines from the retaining flange in a transverse direction toward the front of the wheel, so that the demountable rim may be readily slid on to the felly and placed against the retaining flange 4. The demountable rim 5, carries a resilient tire 6, which is shown herein as a pneumatic tire. The demountable rim 5, as clearly shown in Figs. II, to VI, inclusive, is formed with a body portion 7, which is divided circumferentially into two sections 8, and 9. These sections have their adjacent faces parallel, and are adapted to abut or have their inner edges face each other, though slightly spaced, when the tire is inflated thereon. The section 8, is formed with a flange 10, and the section 9, is formed with a flange 11, between which the tire 6, is held in the well known manner.

The section 8, is provided with a plurality of recesses 12. The wall 13, of the recess is formed with a projection 14, and the inner wall 15, of the projection is inclined from the base of the projection toward the outer face of the rim section. The rim section 9, is formed with a plurality of laterally projecting lugs 16, and each lug is formed with a projecting part 17, which extends substantially parallel with the inner face of the rim section. The inner wall 18, of the projecting portion 17, is inclined from the base of the projecting portion toward the outer face of the rim section. The recess 12, has an entrance neck 19, which is adapted to receive the lug 16. This neck is made sufficiently wide to allow the lug to be inserted in the recess, after which by a relative rotation of the rim sections, the projecting lug portion 17, will seat behind the portion 14, on the wall of the recess 12. The space between the projecting portion 14 of the rim and the inner face, or bottom of the recess, is greater than the width of the projecting part 17, which allows the projecting part 17 to be moved behind the projecting part 14, notwithstanding the adjacent faces of said parts 14 and 17 are inclined. That is to say, when the adjacent edges of the rim sections are in contact, the projecting part 17 is slipping by the part 14, but when said edges of the rim sections are separated by the inflating of the tire, then the inclined faces of the parts 14 and 17 will interlock and prevent the lug or projection 17 from being withdrawn from its seat behind the projecting part 14. The inclined wall 15, will be brought into engagement with the inclined wall 18, when the tire is inflated and pressure is brought to bear on the rim sections which tend to separate one from the other. These inclined walls will therefore, form an interlock and prevent a rotation of one section relative to the other, which will tend to draw the said sections together, the sections being held spaced by the inflated tire.

By my construction of interlocking lug and recess, I am able without any other means, to join the two sections of the rim and hold the same interlocked or assembled merely by the inflating of the tire. I have therefore, provided a demountable rim which is very simple in construction, which may be readily attached to the tire after which the tire may be inflated and the parts firmly held assembled until the rim is placed on the felly of the wheel.

In order to assist in turning one of the sections relative to the other, I may form the section 8, with spaced apertures 20, and the section 9, with spaced apertures 21, which are adapted to receive suitable tools to aid in holding one section while the other is being turned relative thereto.

The demountable rim with the tire attached thereto may be readily slipped on to the tapered face of the felly 3, and the rim seated against the flange 4, carried by the felly. In order to hold the rim firmly seated against said flange, I have provided a plurality of locking devices 22. Each device consists of a bolt 23, which is inserted through a suitable opening in the felly, and said bolt may be held in place by a head 24. Said bolt has threaded thereon, a locking dog 25. The rim 7, is formed with an opening 26. This locking dog 25, is adapted to engage the wall of the recess 26, and by turning the screw, said dog will firmly press the rim against the retaining flange 4. As a further means for locking the rim on the felly, I have provided a nut 27, which is threaded on the bolt 23. This nut is formed with a circular base adapted to extend through a second recess 28, in the rim section 8, and bear against the inner wall thereof, and thus force the rim against the retaining flange 4. The locking bolt is mounted in a tapered recess so that when the nut is loosened and the dog released, said bolt may be swung about its head as an axis to withdraw the locking dog and the nut beneath the tapered face 3, of the felly, so that said demountable rim may be readily slipped from the felly. This locking device however, forms no part of the present invention, as the same is shown, described, and claimed in my co-pending application Serial Number 620,543, filed April 12th, 1911. It will be understood that while I prefer to use these locking devices for holding the rim on the felly, that from certain aspects of the invention, other locking means may be used.

By the above construction, wherein the felly is formed with an inclined surface, and wherein the rim is preferably made of sheet metal, all of one thickness, there is a liability of the dust and dirt creeping in between the rim and the tapered surface of the felly. In order to prevent dust and dirt from crowding in between these parts, I have formed the rim section 8, with a circumferential rib 29, which projects toward the felly and engages the inclined face thereof adjacent its side edge. Said rib effectually prevents the dust and dirt from creeping in between the parts, and also serves as a means for rigidly supporting the rim at this side of the felly. This rigid support for the rim will hold the same in proper position relative to the plane of the wheel and prevent any cramping of the parts.

It is obvious that minor changes in the details of construction may be made without departing from the spirit of my invention, as set forth in the appended claims.

Having thus described my invention, I claim:

1. In a vehicle wheel, a rim having a body portion divided circumferentially into two parallel sections, said sections being disposed edge to edge, and provided respectively with coöperating recesses and projecting lugs which interlock in the direction of rotation, the engaging walls of said recesses and lugs being inclined so as to prevent an unlocking rotation of one section relative to the other when a tire is placed on said rim and inflated.

2. In a vehicle wheel, a rim having a body portion divided circumferentially into two parallel sections lying edge to edge one of said sections having recesses formed in the edge thereof, and a projecting portion for partially closing the recess, the inner wall of said projecting portion being inclined from the base of the projection toward the outer face of the rim, said other section of the rim having a plurality of correspondingly located projecting lugs each of which is formed with a projecting portion adapted to engage in said recesses, the inner wall of said projecting portion being inclined from the base thereof toward the outer face of said rim section, whereby the inclined wall of the recess and the inclined wall of the coöperating lug, may interlock and prevent the rotation of one rim section relative to the other when the tire is inflated.

In testimony whereof, I have hereunto signed my name at Scranton, Pennsylvania, this eighteenth day of September, 1911.

CHARLES W. CRAMER.

Witnesses:
 Geo. L. Peck,
 M. S. Connolly.